R. McC. JOHNSTONE.
WINDING MECHANISM.
APPLICATION FILED JUNE 15, 1920.
1,355,107.
Patented Oct. 5, 1920.
6 SHEETS—SHEET 1.
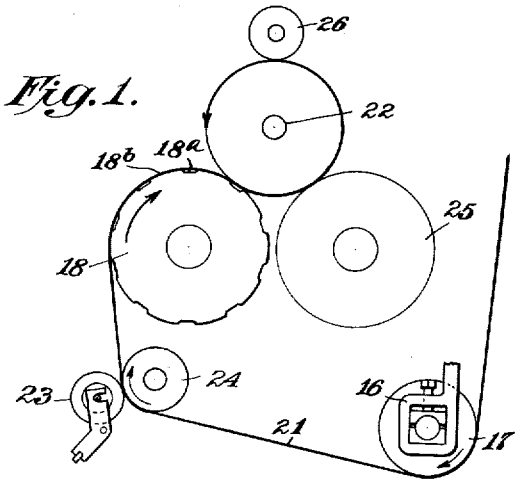
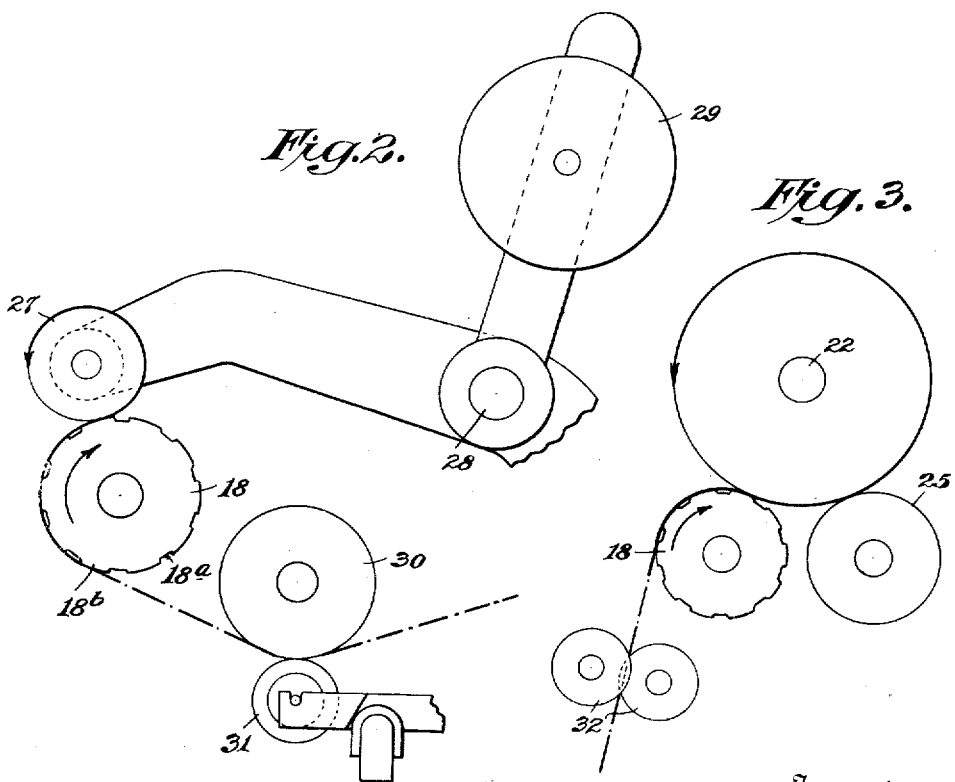
Inventor
Robert McC. Johnstone
By his Attorney R. McC. JOHNSTONE.
WINDING MECHANISM.
APPLICATION FILED JUNE 15, 1920.

1,355,107.

Patented Oct. 5, 1920.
6 SHEETS—SHEET 2.

Inventor
Robert McC. Johnstone.
By his Attorney

R. McC. JOHNSTONE.
WINDING MECHANISM.
APPLICATION FILED JUNE 15, 1920.

1,355,107.

Patented Oct. 5, 1920.
6 SHEETS—SHEET 3.

Inventor
Robert McC. Johnstone
By his Attorney

R. McC. JOHNSTONE.
WINDING MECHANISM.
APPLICATION FILED JUNE 15, 1920.

1,355,107.

Patented Oct. 5, 1920.
6 SHEETS—SHEET 4.

Inventor
Robert McC. Johnstone,
By his Attorney

R. McC. JOHNSTONE.
WINDING MECHANISM.
APPLICATION FILED JUNE 15, 1920.

1,355,107.

Patented Oct. 5, 1920.
6 SHEETS—SHEET 5.

Inventor
Robert McC. Johnstone.
By his Attorney

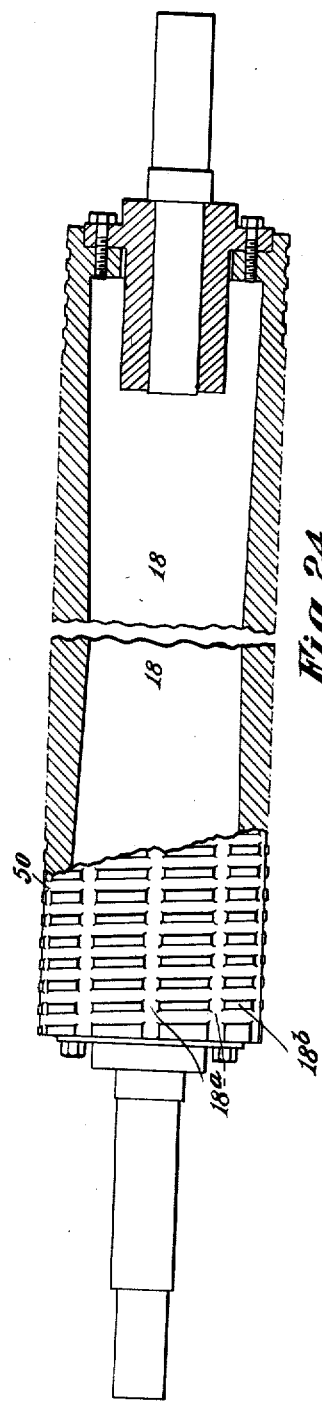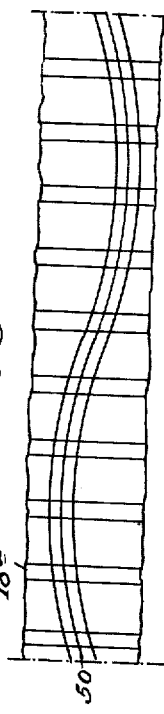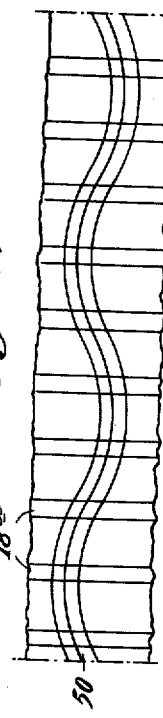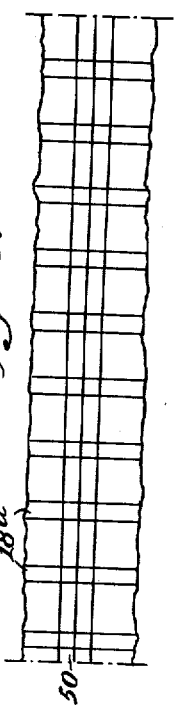

UNITED STATES PATENT OFFICE.

ROBERT McC. JOHNSTONE, OF ROSELLE PARK, NEW JERSEY, ASSIGNOR TO CAMERON MACHINE COMPANY, OF BROOKLYN, NEW YORK, A CORPORATION OF NEW YORK.

WINDING MECHANISM.

1,355,107.

Specification of Letters Patent.

Patented Oct. 5, 1920.

Application filed June 15, 1920. Serial No. 389,234.

*To all whom it may concern:*

Be it known that I, ROBERT McC. JOHNSTONE, a citizen of the United States, and a resident of Roselle Park, in the county of Union and State of New Jersey, have invented certain new and useful Improvements in Winding Mechanism, of which the following is a specification.

This invention relates generally to slitting and rewinding machines, and deals more particularly with a method and means for preventing interweaving of adjacent coils of rewound flexible material.

In the accompanying drawings, the invention is disclosed in several concrete and preferred forms in which—

Figure 1 is a diagrammatic representation of the slitting and rewinding elements of a combined score cutter and surface rewinding machine such as is disclosed in Patent No. 1076189 showing my invention applied thereto.

Fig. 2 is a similar view of a combined surface and center rewinding machine such as is disclosed in Patent No. 1256499 showing my invention applied thereto.

Fig. 3 is a similar view showing the invention applied to a combined shear-cutter and surface rewinding machine.

Fig. 23 is a view partly in section and partly in elevation of a modified form of roller.

Figs. 24, 25 and 26 show still further modified forms.

Figure 4:
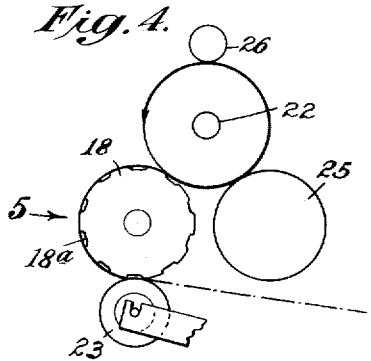
Fig. 4 is a view similar to Fig. 1 in which the cutters act directly against one of the rewinding drums.

Referring to Fig. 1, a web 21 is here shown as coming from any suitable source, passing over roller 17, thence between the score-cutters 23 and 24, which divide it longitudinally, and thence over the front rewinding drum 18, after which the slitted web sections are rewound side by side into coils on shaft 22 by means of rewinding drums 18 and 25 and top pressure roller 26. In this device, the web sections are drawn through the cutters at a substantially constant speed by the action of the rewinding means.

Interweaving of adjacent rewound coils of flexible material is due to many causes and one of them is the formation of transverse wrinkles in the web.

These transverse wrinkles are the result of inqualities in length of the different web sections or of opposite longitudinal side edges of the same web section; a condition that has its origin in variations in thickness of the web due to imperfect adjustment or coördination of the parts of the paper-making machine. What, therefore, occurs is this: The short web or short side edge of a web section is taut longitudinally but a longitudinal slack accumulates in the long web or long side edge of a web section, and this causes the slack web section or sections, to get out of control of the rewinding means and the edges of adjacent sections to overlap and adjacent coils will then interweave. Also when this slack is finally forced past the nip or tangential point between drum 18 and the rewound coils on shaft 22, it is flattened into a palpable crease or fold that generally runs diagonally of the web causing the paper to protrude beyond the normal side edge of the web and thus to be interwoven with the adjacent coil. In connection with machines of this character, it is customary to use a brake, or brakes, that may be located on the mill roll shaft, or elsewhere, for instance, at 16 on the idly rotatable friction roller 17. When the slack accumulates in one slitted section or in one side edge of a section, the tension means will ordinarily be effective only as to that part of the web that is taut, and, in order to get the slack web section rewound into sufficiently hard coils, the tension must be increased, thereby rewinding the short web section into a coil, or coils, of excessive hardness. Certain materials have a surface that will not admit of excessive skin tension. As the drag exerted by the brake increases this tension and tends to produce excessively hard wound coils, it not infrequently happens that a coil will burst, particularly if it becomes moist from atmospheric conditions or otherwise. I have found that these difficulties may in a very large measure be overcome by lengthening the path, as it were, over the normal path through which the web or web sections travel. That is to say, notwithstanding differences in length of web sections or of the opposite longitudinal side edges of a web, accumulation of longitudinal slack is prevented and wrinkles and creases will not be formed. This is accomplished by leading the web or web sections, before it becomes a convolution on the coil, over a roller, engaging the coil, in the surface of which are longitudinally extending hills and valleys or protruberances and depressions or, in plain English, grooves as 18ª separated by surfaces 18ᵇ of the normal circumference of the roller. It will be seen, from inspection of Fig. 1 that the web or web section passes around the circumference of roller 18 for a considerable distance and that if it be of proper length and is advanced under proper tension, it will come in contact only with the high points indicated by surfaces 18ᵇ, of roller 18. If now, one web section or one longitudinal edge of a web is longer than the other, then the taut end will take the normally shortest path and will engage only the high points 18ᵇ, but the longer web section or side of a web section will take a longer path than normal by projecting into grooves 18ª. In this way longitudinal slack will be taken up as fast as it appears without permitting it to accumulate because when a groove 18ª comes opposite the tangential point of roller 18 with respect to the coils on shaft 22, any slight amount of slack will pass by the nip of the rollers and the web or web section immediately becomes a convolution on the coil and the conditions governing its behavior change radically, so much so that there is no difficulty in passing the nip or tangential point between the coil on shaft 70 22 and roller 26. Not only are transverse wrinkles and creases and consequent interweaving of adjacent coils avoided by this method, by the necessity of effecting an extra drag by means of brake 16 is obviated and as a consequence the coils of rewound material, while tightly wound, are not wound so tightly as to cause excessive skin tension and rupture.

Figure 20:
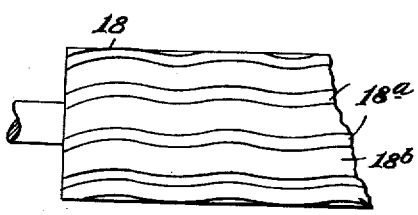
Figs. 20 and 21 are modified forms of the same roller.
Figure 21:
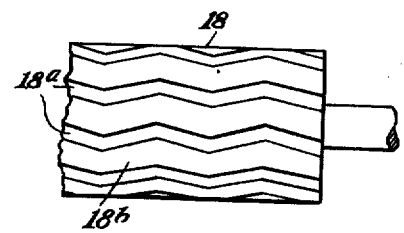
Figure 22:
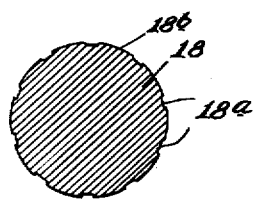
Fig. 22 is a sectional view on the line 22—22 of Fig. 19.

In Figs. 19 to 22 are shown detail views of roller or drum 18 having hills 18ᵇ and valleys 18ª. Grooves 18ª may take various forms. For instance, in Fig. 19 they are shown as extending parallel to the axis of the roller and may extend only part way or over the entire surface of the roller. In Fig. 20 the grooves are sinuous in character and in Fig. 21 of zig-zag shape. The dimensions may vary, but with a fourteen inch diameter of roller grooves of a width of one and one quarter inches and of a depth of one-thirty second of an inch with a distance circumferentially between grooves of three inches have been found very effective. Care should be taken as shown in Fig. 22, to avoid sharp corners or edges at the point where the hills and valleys merge.

Roller 18 may also have, in addition to the longitudinal grooves, circumferential non-helical grooves as 50 for the purpose of nullifying longitudinal wrinkles by creating minute transitory undulations in the web as explained in my application Ser. No. 344256.

In the construction shown in Fig. 1, roller 18 may have both longitudinal grooves 18ª and circumferential grooves 50.

In Fig. 2, the web passes between cutter roll 30 and score-cutter 31 over roller 180 provided with grooves 18ª; and, if desired, also with grooves 50. The slitted sections are then passed to coils 27 carried on an arm pivotally supported on shaft 28, there being a counterweight 29 to vary the tension.

In Fig. 3 is shown a construction that differs from Fig. 1 merely in the employment of overlapping shear cutters 32 in place of score cutters.

Figure 5:
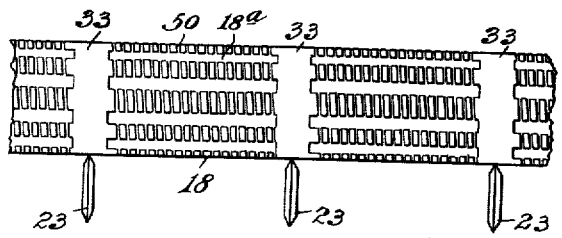
Fig. 5 is a view looking in the direction of the arrow 5 in Fig. 4.

In Figs. 4 and 5, roller 18, in addition to being the front rewinding drum, also acts as a cutter roll with which score cutter 23 engages. When this construction is used smooth surfaces, as 33, are provided on the drum over which grooves 18ª and 50 (if the latter are used) do not extend.

Figure 6:
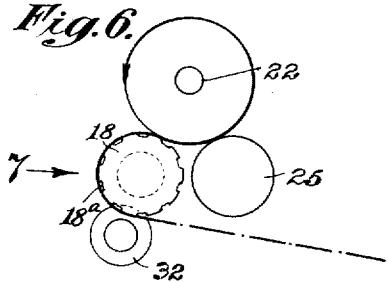
Fig. 6 is a view similar to Fig. 3 in which one of the shear-cutters acts as a rewinding element.
Figure 7:
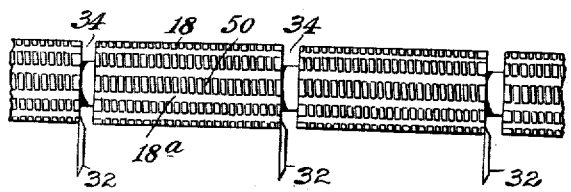
Fig. 7 is a view looking in the direction of the arrow 7 of Fig. 6.

In Figs. 6 and 7, a similar arrangement is shown in connection with shear cutters. Here the front rewinding drum 18 has cutaway portions 34 into which shears 32 extend and coact with a wall of cut-away portion 34 to act as overlapping shears.

Figure 8:
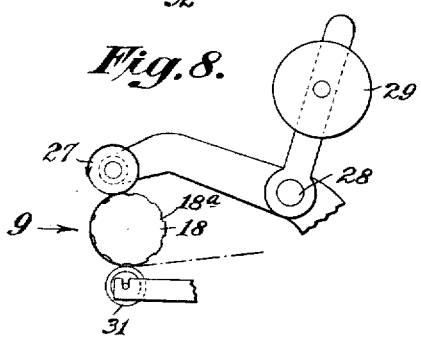
Fig. 8 is a view similar to Fig. 2 in which the cutter acts directly against the rewinding drums.
Figure 9:
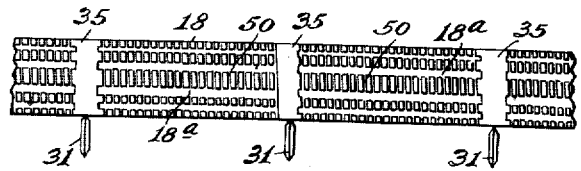
Fig. 9 is a view looking in the direction of the arrow 9 of Fig. 8.

Figs. 8 and 9 are very similar to Fig. 2, the only difference being that roller 180 acts as a cutter drum for score cutter 32, it being, to that end, provided with smooth surfaces 35 devoid of grooves.

Figure 10:
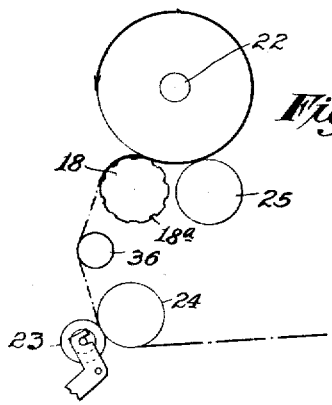
Fig. 10 is a view similar to Fig. 1 in which an extra roller is interposed between the cutters and rewinding elements.

In Fig. 10 is shown a construction similar to Fig. 1 except that grooves 50 are formed in roller 36 instead of in roller 18.

Figure 11:
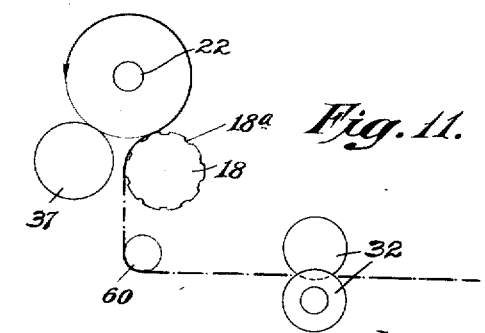
Fig. 11 shows what may be considered a modification of either Fig. 1 or Fig. 3, the web here being threaded up between the rewinding drums.

In Fig. 11 is shown a surface rewinding device in which roller 18 constitutes what is generally known as a back rewinding drum; the web being led over roller 60, that may or may not have circumferential grooves, as 50, and thence up over back rewinding drum 18 and between the latter and front rewinding drum 37. If desired, roller 18 may also be provided with circumferential grooves 50. The slitting means are here illustrated as shear cutters 32.

Figure 12:
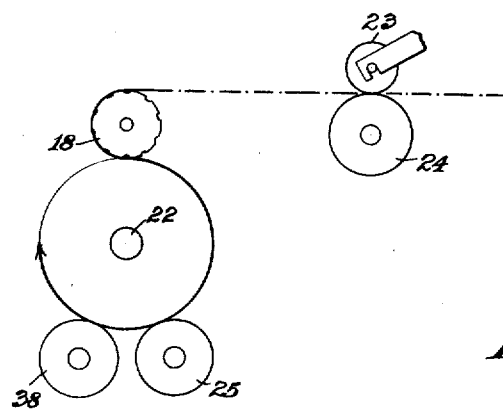
Fig. 12 shows what may be considered a modification of either Figs. 1 or 3, the web here first engaging the top pressure roller.

In Fig. 12, roller 118 is the top pressure roller and the web is led first over this roller and thence to shaft 22. The surface rewinding rollers are here indicated by 38 and 25 and the slitting means by score cutter 23 and cutter roll 24.

Figure 13:
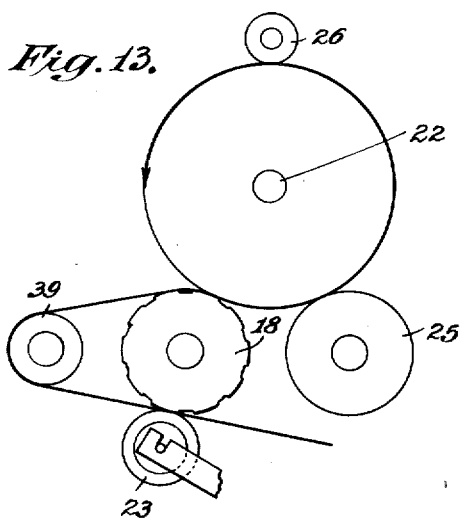
Fig. 13 is a view similar to Fig. 1 in which the web is first led to one of the rewinding drums which acts as a cutting member, then away therefrom and then back to the same rewinding drum.

In Fig. 13, we have substantially the same arrangement as is shown in Fig. 4 except that the web sections after being slitted against roller 18 are led over roller 39, which may have grooves, as 50, and then back again to roller 18.

Figure 14:
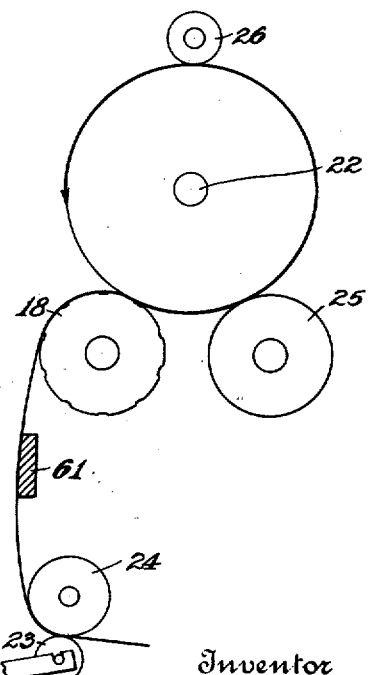
Figs. 14 and 15 show still further modifications of Fig. 1.
Figure 15:
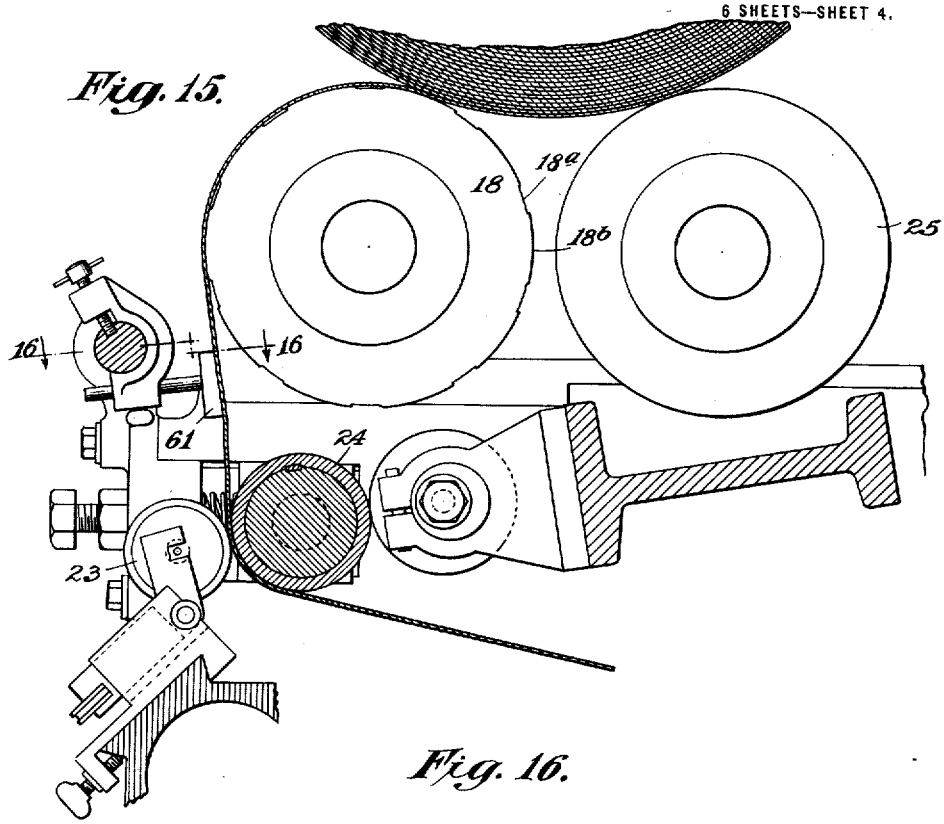
Figure 16:
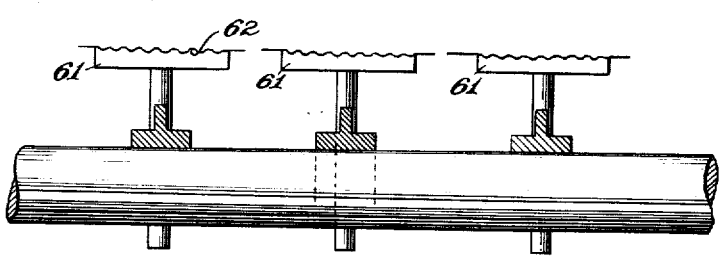
Fig. 16 is a sectional view on the line 16—16 of Fig. 15.
Figure 17:
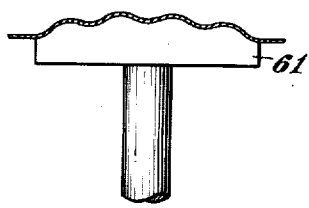
Figs. 17 and 18 are detail views of some of the parts shown in Figs. 15 and 16.
Figure 18:
Figure 19:
Fig. 19 is a view in elevation of a rewinding roller employed in my invention.

In Fig. 14, we have substantially the arrangement shown in Fig. 1, except that here a non-rotatable member 61 is interposed between the slitting and rewinding means, the face of this member 61 having grooves to produce minute transitory undulations lengthwise of the web in a manner similar to that produced by grooves 50. This construction is illustrated more in detail in Figs. 15 to 18. Here is shown a plurality of stationary members 61, each provided with a plurality of serrations or grooves 62 running lengthwise of the web to produce in each web section minute transitory undulations that remove longitudinal wrinkles. These serrations may run straight up and down or may be of other suitable formation, as indicated in Fig. 18. So likewise member 61 may be flat or may be curved transversely of the run of the web as indicated in Fig. 17.

The numerous illustrations of the principle contained in the annexed drawings are not to be taken as limitations but as exemplifications of the many ways in which the invention may be used.

I claim:

1. Means for nullifying transverse wrinkles in a web of flexible material when winding it into a coil comprising: winding means advancing the web under tension, said winding means including a drum engaging the wound material having grooves extending substantially lengthwise of its axis and transversely of the direction of movement of the web, and means for guiding the web over the surface of said drum before it becomes a convolution of the wound material.

2. Means for preventing, during winding, the interweaving of adjacent coils of flexible material due to longitudinal and transverse wrinkles comprising: winding means advancing the web under tension, means for producing numerous minute and negligible transitory longitudinal undulations in each web section, a drum engaging the wound material and forming a part of the winding means having grooves extending substantially lengthwise of its axis and transversely of the direction of movement of the web, and means for guiding the sections over the surface of said drum before they become convolutions of the wound material.

3. Rewinding means comprising: means for advancing a web of flexible material under tension including: a rewinding roller, engaging the surface of the rewound material, having, in its surface, both longitudinal and circumferential grooves for preventing or nullifying, in the web, transverse and longitudinal wrinkles respectively, and means for guiding the web over said roller before it is rewound.

Signed at New York city, in the borough of Manhattan, county and State of New York, this 9th day of June, 1920.

ROBERT McC. JOHNSTONE.